United States Patent
Gelin et al.

(10) Patent No.: US 9,551,381 B2
(45) Date of Patent: Jan. 24, 2017

(54) DEVICE FOR DRIVING A ROTARY TOOL FOR A FOOD PROCESSING APPLIANCE AND FOOD PROCESSING APPLIANCE PROVIDED WITH SUCH A DRIVING DEVICE

(71) Applicant: SANTOS, Vaulx-en-Velin (FR)

(72) Inventors: Cédric Gelin, Saint Fons (FR); Nicolas Fouquet, Chassieu (FR)

(73) Assignee: SANTOS, Vaulx-en-Velin (FR)

( * ) Notice: Subject to any disclaimer, the term of this patent is extended or adjusted under 35 U.S.C. 154(b) by 85 days.

(21) Appl. No.: 14/491,124

(22) Filed: Sep. 19, 2014

(65) Prior Publication Data
US 2015/0083542 A1  Mar. 26, 2015

(30) Foreign Application Priority Data
Sep. 20, 2013  (FR) ...................................... 13 59070

(51) Int. Cl.
| | |
|---|---|
| *F16D 1/108* | (2006.01) |
| *F16D 43/16* | (2006.01) |
| *A47J 43/046* | (2006.01) |
| *A47J 43/08* | (2006.01) |
| *F16D 43/14* | (2006.01) |

(52) U.S. Cl.
CPC ............. *F16D 1/108* (2013.01); *A47J 43/046* (2013.01); *A47J 43/085* (2013.01); *F16D 43/16* (2013.01); *F16D 2043/145* (2013.01)

(58) Field of Classification Search
CPC ................ B04B 2009/085; B04B 9/00–9/146; F16D 1/10–1/116; F16D 43/14–43/16; A47J 43/00–43/288
See application file for complete search history.

(56) References Cited

U.S. PATENT DOCUMENTS

| | | | | |
|---|---|---|---|---|
| 2003/0052206 | A1* | 3/2003 | Fouquet ................ | A47J 43/085 241/92 |
| 2011/0212822 | A1* | 9/2011 | Henne ....................... | B04B 9/08 494/84 |
| 2013/0188894 | A1* | 7/2013 | Peters ....................... | B04B 9/08 384/91 |

FOREIGN PATENT DOCUMENTS

| | | | |
|---|---|---|---|
| DE | 19930593 A1 * | 4/2000 | ............... B04B 9/08 |
| FR | 2829679 A1 | 3/2003 | |
| WO | 2011/001729 A1 | 1/2011 | |

OTHER PUBLICATIONS

Search Report dated Jun. 4, 2014 in corresponding application No. FR 1359070.

* cited by examiner

*Primary Examiner* — Richard Lorence
(74) *Attorney, Agent, or Firm* — Knobbe Martens Olson & Bear LLP (57) ABSTRACT

This device comprises a driving shaft, which is rotary on itself around a central axis and which is secured to a head for driving the tool into rotation around the axis, the tool being added onto the driving head in a removable way. The driving head includes a driving hub which is adapted so as to be engaged with a driven hub of the tool in order to transmit a rotary movement between them. The driving head is provided with locking centrifugal weights for the tool on the driving head, said centrifugal weights being moveable, under the effect of a centrifugal force resulting from the setting into rotation of the driving head by the driving shaft, between a rest position, in which the centrifugal weights do not interfere with the driven hub, and a position of use, in which a portion of each of the centrifugal weights is brought closer to the central axis and mechanically cooperates with (Continued)

the driven hub in order to maintain it engaged with the driving hub.

11 Claims, 5 Drawing Sheets

DEVICE FOR DRIVING A ROTARY TOOL FOR A FOOD PROCESSING APPLIANCE AND FOOD PROCESSING APPLIANCE PROVIDED WITH SUCH A DRIVING DEVICE

The present invention relates to a device for driving into rotation a rotary tool for a food processing appliance. The invention also relates to a food processing appliance including such a driving device.

In the sense of the invention, such an appliance ensures processing of food stuffs which are admitted therein, notably by pressing, cutting out, grating and/or slicing. Such an appliance finds its application to any type of food stuff, whether these are fruit or vegetables, fish or even meat.

This processing appliance may be used in hotel and further restaurant professions. As a non-limiting example, this may be a centrifuge for fruit and vegetables, a cone-shaped juice extractor, a disc rasp or further a disc of a vegetable shredder.

In every case, such a food processing appliance includes a tool, which, during operation, is driven into rotation by a head secured to a motor shaft rotating on itself, for purposes of processing food stuffs admitted into the appliance, and which is removable relatively to this driving head, notably for purposes of cleaning the tool. Thus, in the case of a centrifuge, the latter conventionally includes a fixed base, on which is removably added a rotating basket, this basket comprising a bottom forming a rasp as well as side walls extending from its bottom, which forms a sieve retaining the pulp formed by the rasping while letting the juice flow. An example of such a centrifuge is provided by FR-A-2 829 679.

The object of the present invention is to propose a food processing appliance of the type described above, for which the locking of the removable tool on the driving head in rotation is particularly performing, notably with view to meeting the reliability, durability, stability and silence requirements relating to professional equipment.

For this purpose, the object of the invention is a device for driving to rotation a rotary tool for a food processing appliance, notably a basket for a centrifuge for fruit and vegetables, this device comprising a motor shaft, which may rotate on itself around a central axis and which is secured to a head for driving the tool into rotation around the shaft, the tool being added onto the driving head in a removable way. The driving head includes a driving hub which is adapted so as to be engaged with a driven hub of the tool for transmitting relative motion around the central axis of the driving hub to the driven hub. The driving head is provided with centrifugal weights for locking the tool on the driving head, said centrifugal weights being moveable, under the effect of a centrifugal force resulting from the setting into rotation of the driving head around the central axis by the motor shaft, between a rest position, in which the centrifugal weights do not interfere with the driven hub, and a position of use in which a portion of each of the centrifugal weights is brought closer to the central axis and mechanically cooperates with the driven hub in order to maintain it in engagement with the driving hub.

One of the ideas at the basis of the invention is to seek locking of the central portions with each other, in other words the hubs, belonging to the rotary tool of the food processing appliance and to the head for driving the rotationally driving tool respectively, by exteriorly acting around the driven hub, in order to allow transmission of a significant torque and in a stable way around the central axis defined by the driving shaft of the appliance. According to the invention, the locking of the driving and driven hubs is achieved with centrifugal weights, i.e. mechanical parts using centrifugal force for producing work, which are exteriorly laid out around the hubs. More specifically, the invention provides that under the effect of the centrifugal force resulting from the setting into rotation of the driving head by the motor shaft, several centrifugal weights are moved so that a portion of each of them is brought closer to the central axis until they typically interfere by exerting pressure, with the outer face of the driven hub so as to lock the driven and driving hubs with each other, while, in the absence of the centrifugal force, in other words when the motor shaft is at a standstill, the centrifugal weights occupy a position which lets the free driven hub disengage from the driving hub in order to easily uncouple the tool relatively to the driving head, in particular for purposes of cleaning the tool. The driving device according to the invention thus proves to be particularly efficient, even when the tool is subject to strong transverse stresses to the axis, resulting from its shape, for example basket-shaped, and/or from the presence of food stuffs poorly distributed around the axis, as subsequently explained in more detail.

According to advantageous additional features of the driving device according to the invention, taken individually or according to all the technically possible combinations:

said portion of each of the locking centrifugal weights forms a supporting nose which, when the locking weight is in its position of use, is pressed on a cooperation surface, delimited by the outer face of the driven hub, so as to both maintain axially the driven hub engaged with the driving hub and radially align the driven hub with the central axis;

said cooperation surface is substantially frusto-conical, centered on the central and divergent axis towards the driving hub;

each of the locking centrifugal weights is moveable between its rest position and its position of use by pivoting around an orthoradial axis to the central axis;

the driving head further includes a support, which is at least partly laid out exteriorly around the driving hub and on which are borne the locking centrifugal weights freely moveable between their rest position and their position of use, notably by pins respectively centered on orthoradial axes to the central axis;

three locking centrifugal weights are provided, which are positioned at 120° from each other around the central axis;

the driving hub and the driven hub respectively include driving branches and driven branches, which each extend substantially parallel to the central axis and which are positioned in a substantially regular way around the central axis while being separated pairwise by a driving niche and a driven niche respectively, the driving branches being received into the driven niches and the driven branches being received in the driving niches when the driving and driven hubs are engaged with each other, and each of the driven branches, has, at its free axial end, edges which are opposed to each other along a peripheral direction to the central axis and which, under the effect of the locking weights in their position of use, are pressed on walls formed in the bottom of the driving niche receiving the driven branch, by forming supporting components, both parallel and orthoradial to the central axis;

each of the driving and driven branches is provided, outside its free axial end, with at least a rectilinear edge, which is substantially parallel to the central axis, said or one of the rectilinear edges of each driving branch being pressed, by forming a supporting component essentially, or even exclusively orthoradial to the central axis, on said or one of the rectilinear edges of one of the driven branches when the motor shaft is set into rotation on itself and as long as the locking centrifugal weights have not reached their position of use from their rest position;

each of the driving branches has a blunt free axial end against which the free axial ends of the driven branches slide along a peripheral direction to the central axis when the driven branches are introduced into the driving niches.

The object of the invention is also a food processing appliance, notably a centrifuge for fruit and vegetables, including a rotary tool, notably a basket, and a device for driving this tool into rotation, which is as defined above and on the driving head of which the tool is added in a removable way.

The invention will be better understood upon reading the description as follows, only given as an example and made with reference to the drawings wherein.

In FIGS. 1 to 5, a device 1 is illustrated for driving a tool 2 into rotation around a geometrical axis X-X. The device 1 and the tool 2 belong to a food processing appliance, which is not illustrated in totality in the figures and which, as an example, is one of the appliances listed in the introductory part of the present document.

The tool 2 includes a main body 4, which is substantially centered on the axis X-X and which, in the figures, has a globally discoidal shape, it being understood that this geometry is not limiting for the present invention considering the multitude of embodiments for the tool 2 according to the food processing appliance to which belongs this tool.

As a purely illustrative example, the main body 4 forms the bottom wall of a basket belonging to a centrifuge for fruit and vegetables, the face 4A of this bottom wall, which is turned opposite to the driving device 1, being provided with rasping spikes, not shown in the figures, as well as with a peripheral sieve also not shown.

More generally, it is recalled that the tool 2 may assume diverse forms such as a basket, a drum, a cylinder, a disc etc., with view to ensuring equally diverse functions resulting from its setting into rotation on itself around the axis X-X, such as rasping, cutting, wringing, pressing, slicing functions, etc. in the field of food processing.

For convenience, the continuation of the description is oriented relatively to the axis X-X, by considering that the terms of <<top>> and <<upper>> correspond to an axial direction towards which is turned the face 4A of the main body 4 of the tool 2, the aforementioned axial direction therefore being turned towards the top portion of FIGS. 1 to 5, while the terms of <<lower>> and <<low>> correspond to an axial direction with an opposite sense. Thus, the face 4A of the main body of 4 forms the upper face of this body, while its axially opposite face 4B forms the lower face thereof.

The tool 2 includes a hub 6, which is centered on the X-X axis and which axially extends downwards from the face 4B of the main body 4 of the tool 2. The hub 6 is secured to the main body 4 for example by being made with it in the same material. In the exemplary embodiment considered in the figures, the hub 6 has a global tubular shape which is centered on the axis X-X and the cylindrical internal bore 8 is open downwards, as well as open upwards, while opening into a central through-bore 10 of the main body 4.

For reasons which will appear later on, the hub 6 includes an upper ring 12 which is centered on the X-X axis, which connects the remainder of the hub 6 to the face 4B of the main body 4. It will be noted that the aforementioned ring 12 may, as an alternative not shown, have a larger axial dimension than the one illustrated in the figures.

The outer face of the ring 12 is provided with a recessed bulge 14. This bulge 14 runs over the whole outer periphery of the ring 12 and is delimited downwards by a frustoconical surface 14A, centered on the X-X axis and divergent downwards.

The hub 6 further includes three elongated branches 16, which extend in length parallel to the X-X axis, while protruding downwards from the ring 12. These branches 16 somewhat form extensions of the ring 12 downwards in the sense that the outer and inner faces of each of these branches 16 respectively belong to cylindrical geometrical covers defined by the inner and outer faces of the ring 12 respectively, more generally defined by the outer and inner faces of the tubular hub 6. The branches 16 are regularly positioned around the X-X axis, while being separated pairwise by a niche 20. Each of the niches 20 is both open upwards and in both senses of a direction radial to the X-X axis. At the same time, each of the niches 20 is closed both upwards by a peripheral portion of the lower end of the ring 12, and along a direction peripheral to the axis X-X, by two of the branches 16 in succession around the axis X-X.

Figure 2:
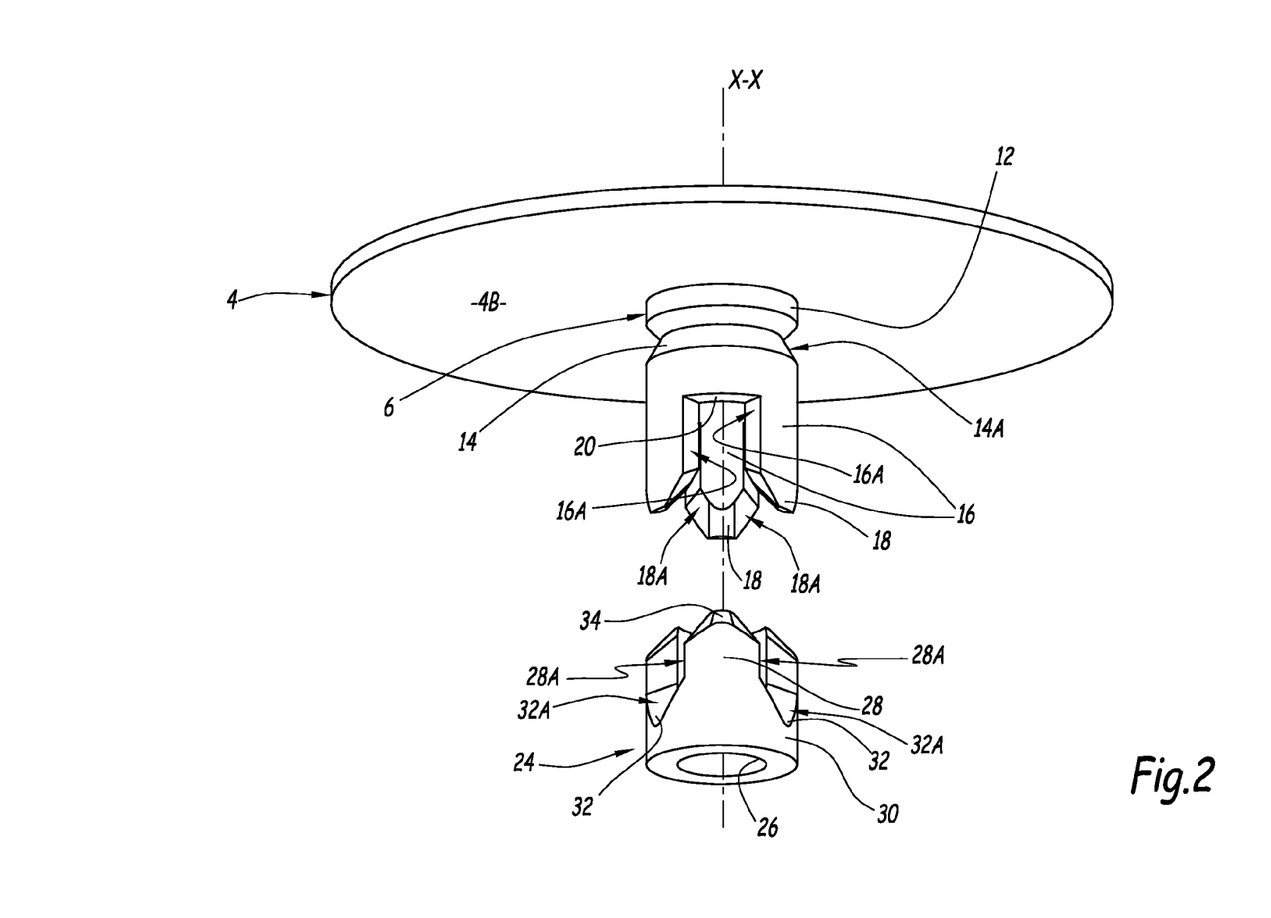
FIG. 2 is a similar view to FIG. 1, showing under a different viewing angle, only a portion of the driving device, as well as the tool.

As well visible in FIG. 2, each of the branches 16 has a lower axial end 18, which is free and tapered downwards, while delimiting two edges 18A opposite to each other along a direction peripheral to the axis X-X, which converge towards one another downwards. Further, each of the opposite edges 18A of the free end 18 is connected upwards to the lower end of the ring 12, through a rectilinear edge 16A, which is delimited by the corresponding branch 16 and which extends substantially parallel to the axis X-X.

Figure 1:
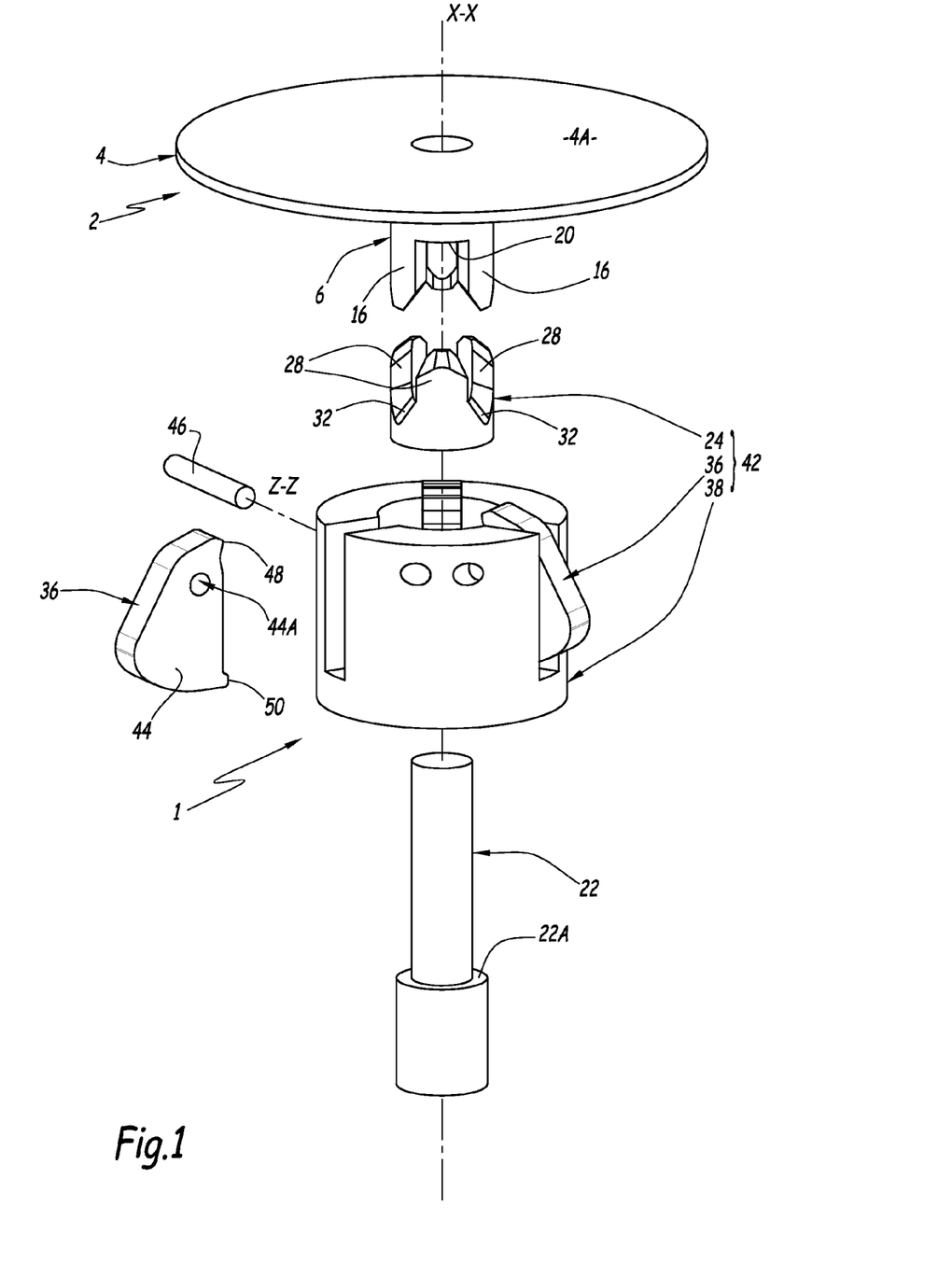
FIG. 1 is a perspective view of an exploded view of a driving device according to the invention, associated with a rotary tool to be driven by this device.
Figure 3:
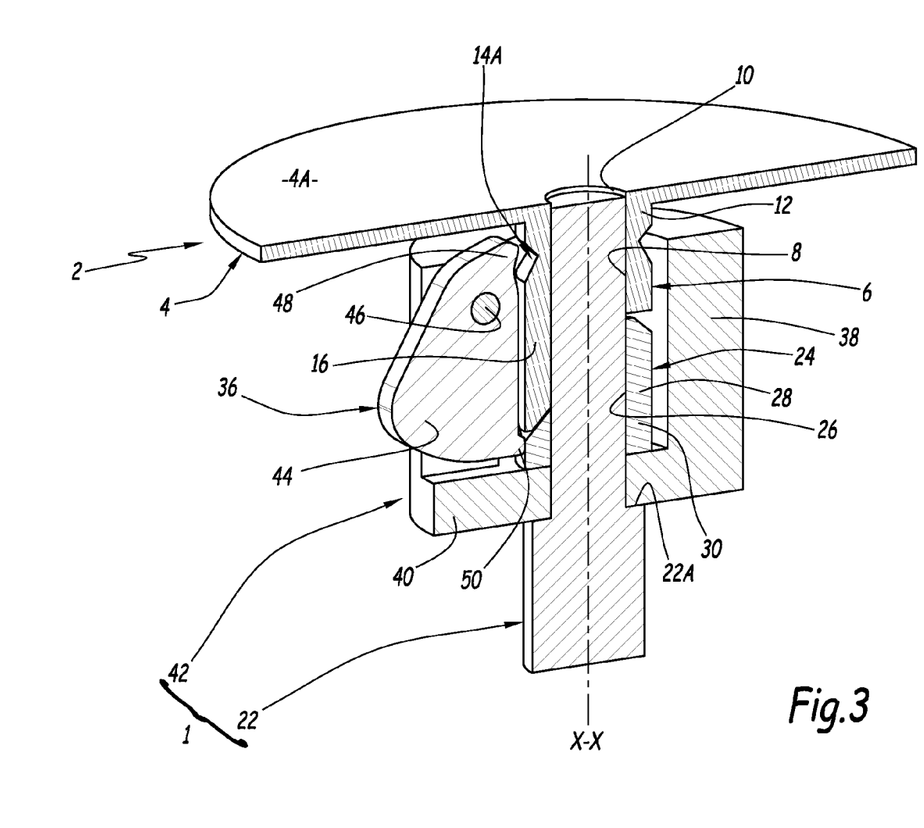
FIG. 3 is a perspective view of a longitudinal section of the driving device and of the tool of FIG. 1, in an assembled and unlocked configuration.

As well visible in FIGS. 1 and 3, the driving device 1 includes a shaft 22, which is centered on the X-X axis and which is described as a driving shaft in the sense that this shaft 22 is designed so as to be set into rotation on itself around the X-X axis by a motor, not shown, notably an electric motor. When the tool 2 is assembled to the driving device 1, the upper terminal portion of the shaft 22 is, coaxially and substantially complementarily, received in the bore 8 of the hub 6 and if necessary in the bore 10 of the main body 4.

The driving device 1 further includes a hub 24, which is secured to the driving shaft 22. As well visible in FIGS. 1 to 3, the hub 24 has, in the exemplary embodiment considered in the Figures, a global tubular shape, which is centered on the X-X axis and the internal bore 26 of which coaxially and substantially complementarily receives the driving shaft 22. When the tool 2 is assembled to the driving device 1, the hub 24 and the hub 6 are designed so as to be engaged with each other for transmitting a rotary movement around the axis X-X, from the driving shaft 22 to the main body 4, successively via the hub 24 and the hub 6. Thus, it is understood that the hub 24 may be described as a driving hub while the hub 6 may be described as a driven hub.

In the exemplary embodiment considered in the figures and as well visible in FIGS. 1 and 2, the hub 24 includes three elongated branches 28, which extend in length parallel to the axis X-X, and which protrude upwards from a lower ring 30 of the hub 24. The branches 28 are regularly positioned around the axis X-X, while being separated pairwise by a niche 32. The structure with three branches and three niches of the hub 24 is similar to the structure with three branches and with three niches of the hub 6: when the tool 2 is assembled to the driving device 1, as in FIGS. 3 to 5, each of the branches 16 of the hub 6 is received in one of the niches 32 of the hub 24 while each of the branches 28 of the hub 24 is received in one of the niches 20 of the hub 6, thereby causing engagement of the hubs 6 and 24 with each other.

For reasons which will appear later on, and unlike the bottom of the niches 20 of the hub 6, the bottom of each of the niches 32 of the hub 24 is dug out downwards so that this bottom of the niche 32 forms walls 32A, laid out facing each other along a peripheral direction to the axis X-X, which converge towards each other downwards and which receive between them the tapered free end 18 of the corresponding branch 16 of the hub 6. Each of these walls 32A is connected upwards to the free end 34 of one of the branches 28 through a rectilinear edge 28A which is delimited by the corresponding branch 28, while extending parallel to the axis X-X.

Also for reasons which will appear later on, the free end 34 of each branch 28 does not have the same conformation as the free ends 18 of the branches 16 of the hub 6. Here, this free end 34 is simply blunt.

As illustrated in FIGS. 1 and 3, the driving device 1 also includes centrifugal weights 36 which, in the exemplary embodiment considered here, are borne by a common support 38 secured to the driving shaft 22. As well visible in FIG. 3, this support 38 here has a global tubular shape, which is centered on the axis X-X and which exteriorly surrounds the hub 24, which lays out the centrifugal weights exteriorly around the hub 24, as well as from the hub 6 in the presence of the tool 2. In the relevant embodiment in the figures, the support 38 includes a transverse wall 40, a central bore of which is mounted in a coaxial and complementary way around the driving shaft 22 and which is axially interposed between the lower ring 30 of the hub 24 and a shoulder 22A of the driving shaft 22, this transverse wall 40 may thus advantageously participate in forming the secured joint between the hub 24 and the driving shaft 22. This being the case, other embodiments may be contemplated as regards the layout of the driving shaft 22, of the hub 24 and of the support 38, from the moment that these three components are, when operating, secured to each other and this by any suitable means not shown in the figures.

In every case, and as this will become more apparent in detail from the description of their operation, it may be considered that the driving hub 24, the centrifugal weights 36 and the support 38 belong to a head 42 for driving the tool 2 into rotation around the axis X-X, which is secured to the driving shaft 22 and on which the tool 2 is provided to be added in a removable way.

In the relevant example, the centrifugal weights 36 are three in number, regularly distributed around the axis X-X, which amounts to stating that they are positioned at 120° from each other around this axis.

Each of the centrifugal weights 36 is mounted so as to pivot freely, relatively to the support 38, around an axis Z-Z which is also radial to the axis X-X. In the exemplary embodiment considered in the figures, the body 44 of each centrifugal weight 36 delimits a through-hole 44A, which is centered on the axis Z-Z and which receives in a coaxial and complementary way, a pin 46, around which the centrifugal weight 36 may freely pivot and which is secured to the support 38.

Figure 4:
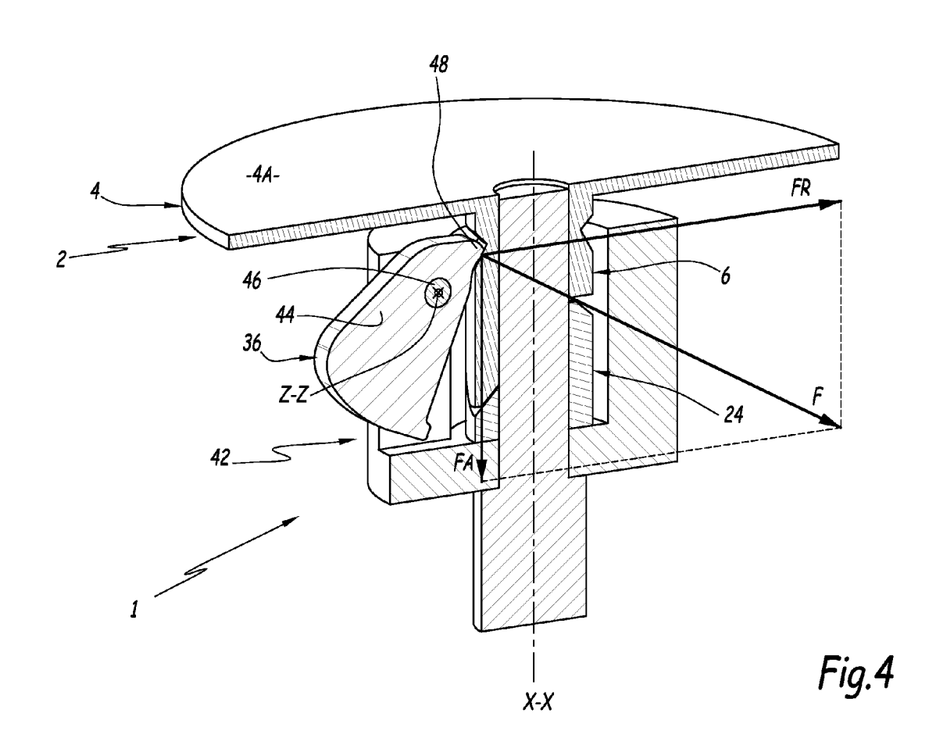
FIG. 4 is a view similar to FIG. 3, illustrating the driving device and the tool in an assembled and locked configuration.

As well visible in FIG. 3, the body 44 of each centrifugal weight 36 includes, protruding from its face turned towards the axis X-X, an upper nose 48 and a lower leg 50, this nose 48 and this leg 50 being located on either side of a geometrical plane, containing the Z-Z axis and perpendicular to the X-X axis. In the assembled condition of the driving shaft 22, of the hub 24 and of the support 38, and when the other driving shaft is at a standstill, i.e. it does not rotate on itself around the X-X axis, the centrifugal weights 36 each occupy a rest position, which is shown in FIG. 3 and in which, under the gravitational effect of the weight of their body 44, their leg 50 radially bears, in the X-X axis direction, against the lower ring 30 of the hub 24, while the nose 48 is radially distant from the X-X axis by a value strictly greater than the radius of the outer cylindrical face of the hub 6. When the driving shaft 22 rotates on itself around the axis of X-X, each of the centrifugal weights 36 pivots around the Z-Z axis, under the effect of a centrifugal force resulting from the rotation of the shaft, from its rest position of FIG. 3 to a position of use, which is shown in FIG. 4 and in which the leg 50 is further radially shifted away from the X-X axis than in the rest position of the weight, while the nose 48 is brought closer to the X-X axis, i.e. it occupies a radially closer position to the axis X-X than the one occupied in the rest position of the weight.

The operation of the tool 2, as well as of its device for driving it into rotation 1 will now be explained in the following.

First of all, the question is of showing the tool 2 on the driving head 42. Advantageously, this operation is performed by only making the most of gravity: indeed, bringing the hub 6 on the hub 24 axially closer downwards spontaneously leads to the introduction of the branches 16 of the hub 6 into the niches 32 of the hub 24, if necessary by transverse sliding of the free ends 18 of the branches 16 of the hub 6 against the blunt free ends 34 of the branches 28 of the hub 24, until the free ends 18 of the branches 16 of the hub 6 are received in the bottom of the niches 32 of the hub 24, between the walls 32A of each of its bottoms. The hubs 6 and 24 are then engaged with each other.

It should be noted that this operation for mounting the tool 2 on the driving head 42 is particularly simple, insofar that it is not hindered by the centrifugal weights 36, in particular by the noses 48 of these centrifugal weights, since the latter are in their rest position of FIG. 3. In other words, in this configuration, the centrifugal weights 36 do not interfere with the driven hub 6.

Next, when the driving shaft 22 is set into rotation on itself around the X-X axis, under the action of its motor (not shown), the centrifugal force resulting from this setting into rotation, acts on the centrifugal weights 36 by gradually having them pass from their rest position of FIG. 3 to their position of use of FIG. 4. This being the case, before the centrifugal weights 36 actually reach their position of use, a torque around the axis X-X is transmitted from the driving shaft 22 to the tool 2, by orthoradial pressure on one of the rectilinear edges 28A of each of the branches 28 of the hub 24 against the associated rectilinear edge 16A of the branches 16 of the hub 6: thus, by direct pressure between the aforementioned rectilinear edges 28A and 16A, the branches 28 of the driving hub 34 bear against the branches 16 of the driven hub 6 while forming exclusively a supporting component, or at the very least, essentially orthoradial to the X-X axis, by thereby driving the tool 2, into rotation around the axis X-X, and this even if the tool 2 is not strictly mounted extensively on the driving head 42, or else even if the setting of the tool 2 into rotation induces a slight imbalance of this tool, transversely to the X-X axis, for example, due to the presence of food stuffs distributed in a non-homogeneous way, around the axis X-X, on the face 4A of the main body 4 of this tool 2.

Once the centrifugal weights have reached their position of use of FIG. 4, their nose 48 under the effect of the centrifugal force acting on the centrifugal weights 36, is flattened and bears against the outer frusto-conical surface 14A of the hub 6, while forming a supporting force referenced as F in FIG. 4, with both an axial FA component which is directed downwards and a radial FR component which is directed towards the X-X axis. It is understood that under the effect of the axial component FA of the thereby generated supporting force F, each of the centrifugal weights 36 axially maintains the driven hub 6 in an engagement with the driving hub 24, in the sense that, if need be, the tool 2 is found again mounted extensively on the driving head 42 on the one hand and any untimely disengagement of the tool 2 upwards relatively to the driving device 1 is prevented on the other hand. And, under the effect of the radial component FR of this supporting force F, the centrifugal weights 36, considered together, ensure centering of the hub 6 on the axis X-X, while radially aligning the hub 6 with this axis X-X.

More generally, it is understood that, in their position of use, the centrifugal weights 36 at least axially and advantageously coaxially lock the driving head 42 with the hub 6 and therefore with the tool 2. This locking is particularly performing because it results from an action of the noses 48 of the centrifugal weights 36 on the outer face of the driven hub 6, this action inducing both great efficiency and great stability for driving the tool 2 with the head 42. These performances are determining in the field of professional food processing equipment since the rotary tool 2 may process a large amount of foodstuffs simultaneously, which may be poorly distributed around the axis of X-X, which induce considerable centrifugal forces, in particular when the tool includes a peripheral basket or the like and/or which may even induce stresses upwards depending on the interaction between the tool and the foodstuffs, for example in the case of slicing foodstuffs.

Figure 5:
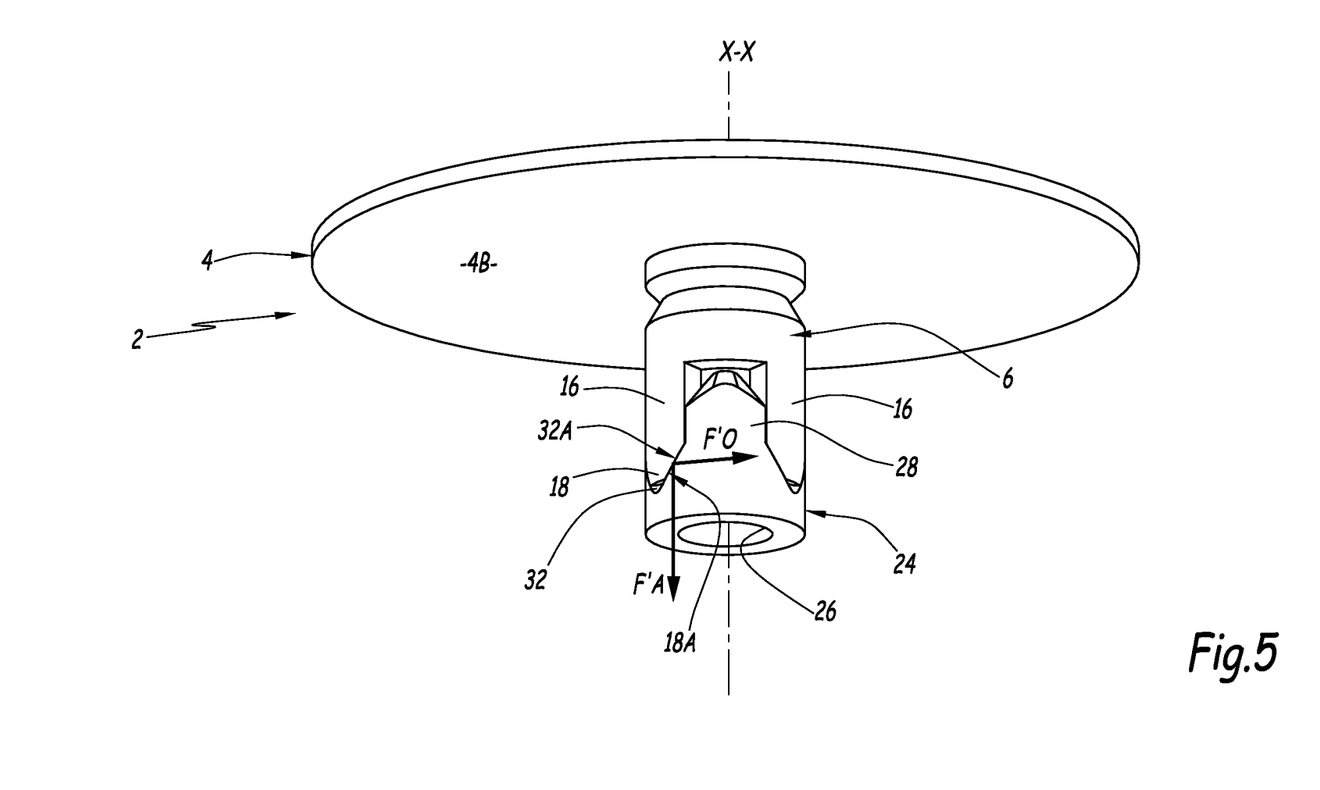
FIG. 5 is a similar view to FIG. 2, showing the aforementioned portion of the driving device and the tool in the assembled and locked configuration of FIG. 4.

Further, according to a particularly advantageous arrangement, the axial force FA of the supporting force F of the centrifugal weights 36, in the position of use on the hub 6, acts on the branches 16 of this hub 6 so that the opposite edges 18A of each of their free ends 18 bear upon the walls 32A formed in the bottom of each of the niches 32 of the hub 24, by forming supporting components between these edges 18A and these walls 32A, which are both parallel to the axis X-X and directed downwards, as indicated by the reference F'A in FIG. 5, and orthoradial to this axis X-X, as indicated with reference F'O in FIG. 5. In this way, the transmission of the torque between the driving hub 24 and the driven hub 6 is essentially or even exclusively achieved through the edges 18A and the wall 32A, which are firmly pressed against each other in a locked way by the centrifugal weights 36, which stabilizes the torque transmission. In particular, vibratory phenomena are neutralized and the wear of the parts is significantly limited, and this both at the interface between the driving and driven hubs and at the interface between the driven hub and the centrifugal weights 36. This gives a particularly silent nature to the food processing appliance to which belong the tool 2 and the driving device 1.

Upon stopping the motor, the speed of rotation of the driving head 42 gradually decreases, so that each weight 36 is moved from its position of use as far as its rest position, under the gravitational effect of the weight of its body 44. The disassembling of the tool 2 may then be ensured in a particularly simple way, given that this action is not hampered by the centrifugal weights 36, in particular by their nose 48 which no longer interferes with the hub 6. Again, it is understood that this facility of disassembling and that of the subsequent reassembling are determining in the field of professional equipment.

Various alternative arrangements to the driving device 1 to the tool 2 may moreover be contemplated:

rather than providing three centrifugal weights positioned at 120° relatively to each other around the axis X-X, only two centrifugal weights may be provided, diametrically opposite to each other, or else four centrifugal weights or even more may also be suitable;

rather than being frusto-conical and/or formed by the lower portion of a bulge similar to the bulge 14, the surface 14A of the driven hub 6, against which the centrifugal weights 36 bear in their position of use, may have diverse embodiments, from the moment that they cooperate with the centrifugal weights in the position of use, in order to lock the driven hub 6 in engagement with the driving hub 24, advantageously by axially maintaining the driven hub 6 against the driving hub 24 and by centering the driven hub 6 on the central axis X-X of the driving shaft 22; and/or also the number and the geometry of the branches 16 and 28 of the driven 6 and driving 24 hubs are not limited to the exemplary embodiment considered in the figures.

The invention claimed is:

1. A device for driving into rotation a rotary tool for a food processing appliance, this device comprises a driving shaft, which is rotatable around a central axis and which is secured to a driving head for driving a tool into rotation around the central axis, the tool being added onto the driving head in a removable way, wherein the driving head includes a driving hub which is adapted to be engaged with a driven hub of the tool for transmitting a rotary movement around the central axis from the driving hub to the driven hub, wherein the driving head is provided with locking centrifugal weights for locking the tool on the driving head, which locking centrifugal weights are moveable, under the effect of a centrifugal force resulting from rotating the driving head around the central axis by the driving shaft, between a rest position, in which the locking centrifugal weights do not interfere with the driven hub and a position of use, in which a portion of each of the locking centrifugal weights is brought closer to the central axis and mechanically cooperates with the driven hub for maintaining the driven hub engaged with the driving hub, wherein the driving hub and the driven hub respectively include driving branches and driven branches, which each extend in a substantially parallel way to the central axis and which are positioned in a substantially regular way around the central axis while being pairwise separated by a driving niche and a driven niche respectively, the driving branches being received in the driven niches and the driven branches being received in the driving niches when the driving and driven hubs are engaged with each other, and wherein each of the driven branches has, at a free axial end thereof, edges which are opposite to each other along a peripheral direction to the central axis and which, under the effect of the locking centrifugal weights in their position of use, are supported on walls formed in the bottom of the driving niche receiving the driven branch, by forming supporting components both parallel and orthogonal to the central axis.

2. The device according to claim 1, wherein said portion of each of the locking centrifugal weights forms a supporting nose which, when the locking centrifugal weight is in its position of use, is supported on a cooperation surface, delimited by the outer face of the driven hub, so as to both axially maintain the driven hub engaged with the driving hub and radially aligning the driven hub with the central axis.

3. The device according to claim 2, wherein said cooperation surface is frusto-conical, centered on the central axis and diverging towards the driving hub.

4. The device according to claim 1, wherein each of the locking centrifugal weights is moveable between its rest position and its position of use by pivoting around an axis orthogonal to the central axis.

5. The device according to claim 1, wherein the driving head further includes a support which is at least partly laid out exteriorly around the driving hub and on which the locking centrifugal weights are borne so as to be freely moveable between their rest position and their position of use.

6. The device according to claim 5, wherein the locking centrifugal weights are borne on the support by pins centered on orthogonal axes to the central axis respectively.

7. The device according to claim 1, wherein three locking centrifugal weights are provided and are positioned at 120° from each other around the central axis.

8. The device according to claim 1, wherein each of the driving and driven branches is provided, outside a free axial end thereof, with at least one rectilinear edge which is substantially parallel to the central axis, said at least one rectilinear edge of each driving branch bearing, while forming a supporting component essentially orthogonal to the central axis, upon said at least one rectilinear edge of one of the driven branches when the driving shaft is set into rotation on itself and as long as the locking centrifugal weights have not reached their position of use from their rest position.

9. The device according to claim 8, wherein said at least one rectilinear edge of each driving branch bears upon said at least one rectilinear edge of one of the driven branches while forming a supporting component exclusively orthogonal to the central axis.

10. The device according to claim 1, wherein each of the driving branches has a blunt free axial end, against which the free axial ends of the driven branches slide along a peripheral direction to the central axis when the driven branches are introduced into the driving niches.

11. A food processing system, including a rotary tool and a device for driving this tool into rotation, which is compliant with claim 1 and on the driving head of which the tool is added in a removable way.

* * * * *